United States Patent [19]

Jonsson et al.

[11] Patent Number: 5,594,861
[45] Date of Patent: Jan. 14, 1997

[54] METHOD AND APPARATUS FOR HANDLING PROCESSING ERRORS IN TELECOMMUNICATIONS EXCHANGES

[75] Inventors: Anders Jönsson, Stockholm; Uffe Winberg, Bandhagen; Charles G. E. Lignell, Alvsjo; Chung M. Lee, Uista; Peter Larsen, Fredriksberg, all of Sweden

[73] Assignee: Telefonaktiebolaget L M Ericsson, Stockholm, Sweden

[21] Appl. No.: 512,275

[22] Filed: Aug. 18, 1995

[51] Int. Cl.$^6$ ............................................. G06F 11/34
[52] U.S. Cl. ................... 395/181; 395/185.01; 379/242
[58] Field of Search ........................ 395/181, 183.14, 395/182.13, 182.14, 182.15, 185.01; 364/285, 265.6, 266.5; 379/242

[56] References Cited

U.S. PATENT DOCUMENTS

| | | | |
|---|---|---|---|
| 4,045,661 | 8/1977 | Antoine et al. | 395/182.15 |
| 4,371,754 | 2/1983 | De et al. | 395/182.08 |
| 4,554,661 | 11/1985 | Bannister | 395/183.21 |
| 4,914,572 | 4/1990 | Bitzinger et al. | 395/182.08 |
| 5,008,927 | 4/1991 | Weiss et al. | 379/98 |
| 5,117,352 | 5/1992 | Falek | 395/182.02 |
| 5,119,377 | 6/1992 | Cobb et al. | 371/19 |
| 5,129,080 | 7/1992 | Smith | 395/575 |
| 5,138,617 | 8/1992 | Edwards | 371/16.1 |
| 5,151,987 | 9/1992 | Abraham et al. | 395/182.18 |
| 5,153,881 | 10/1992 | Bruckert et al. | 364/268.4 |
| 5,157,667 | 10/1992 | Carusone, Jr. et al. | 371/29.1 |
| 5,159,597 | 10/1992 | Monahan et al. | 395/181 |
| 5,181,204 | 1/1993 | Kasman | 395/183.21 |
| 5,257,369 | 10/1993 | Skeen et al. | 395/650 |
| 5,291,494 | 3/1994 | Bruckert et al. | 395/182.22 |
| 5,297,274 | 3/1994 | Jackson | 364/281.7 |
| 5,440,726 | 8/1995 | Fuchs et al. | 395/82.18 |

FOREIGN PATENT DOCUMENTS

| | | |
|---|---|---|
| 0310781A2 | 5/1988 | European Pat. Off. . |
| 0403415A3 | 5/1990 | European Pat. Off. . |
| 0455442A2 | 4/1991 | European Pat. Off. . |
| 0524077A1 | 10/1992 | European Pat. Off. . |
| WO94/18621 | 8/1994 | WIPO . |

OTHER PUBLICATIONS

IBM Technical Disclosure Bulletin, vol. 37, No. 6B, 1906–1994, New York US, pp. 405–409, XP 000456049, "Software Error Early Detection and Data Capture Smart Entry".

Primary Examiner—Robert W. Beausoliel, Jr.
Assistant Examiner—Albert Decady
Attorney, Agent, or Firm—Jenkens & Gilchrist, P.C.

[57] ABSTRACT

Error handling in a telecommunications exchange is performed in a process centralized fashion. Certain objects in each process are defensively programmed to detect and report errors. One error handler object is provided for each process, with the error handler object receiving the error reports, analyzing the reports and specifying error recoveries including a default behavior for recovery from errors based on a default error analysis. In situations where the default analysis and recovery does not adequately address anticipated errors, specialized error analyses and recoveries are designed for and specified by the error handler object.

15 Claims, 3 Drawing Sheets

METHOD AND APPARATUS FOR HANDLING PROCESSING ERRORS IN TELECOMMUNICATIONS EXCHANGES

BACKGROUND OF THE INVENTION

1. Technical Field of the Invention

The present invention relates to software error handling and, in particular, to a method and apparatus for detecting, isolating, analyzing, and recovering from telecommunications application processing errors occurring within telecommunications exchanges.

2. Description of Related Art

Telecommunications switching systems (exchanges) are designed to provide at least the functions necessary to make the simple communications connection between Subscriber A and Subscriber B (commonly referred to as "plain old telephone service" or POTS). Exchanges are now further being designed to provide subscribers with a variety of telecommunications facilities (services and features) in addition to just POTS Service. These facilities include, for example, the popular call waiting and three-party call features used by many subscribers everyday.

Telecommunications facilities are provided within exchanges through a combination of hardware and software components. In spite of the demands of the communications subscriber for what would appear to be perpetually available telephone service, hardware failures and/or software errors do sometimes occur within the exchange. Such failures and errors often result in a partial or complete failure of the telecommunications exchange and a termination of communications services. In addressing the issue of exchange failure, service providers have concentrated on the development and installation of fault tolerant exchange hardware. For example, it is now standard that redundant hardware components be utilized in the exchange.

Little emphasis, however, has been placed on addressing exchange failures caused by software errors. One reason for this is that the complex telecommunications facilities software applications running on exchange platforms are often times developed by different teams of programmers in distinct, interacting software sections. While each programming team provides for some type of software fault tolerance and error recovery for their section, the error handling and recovery programming developed by one team of programmers for one software section differs from and often does not coordinate with the programming developed by other teams of programmers for other software sections. Corresponding types of errors are thus likely to be handled differently or inappropriately by the various software sections with sometimes disastrous or inconsistent results.

It is vitally important that software errors be quickly detected and responded to in such a way that the errors do not propagate to other parts of the system. It is also important that the system recover from the errors as quickly as possible. Furthermore, it is important that any included error handling functionality in a software system provide a coordinated response to detected errors.

SUMMARY OF THE INVENTION

The present invention provides a method and apparatus for detecting and recovering from errors occurring in software applications. The individual processes executing in such applications each include an object providing process centralized error handling functionality. Certain ones of the other objects within each process are defensively programmed to detect and report on the occurrence of errors to the error handling functionality. The received error reports are then analyzed by the error handling functionality to determine and specify a recovery for returning the application owning the process in which the error occurred to a well defined state. Both default and specialized error analyses and recoveries are implemented by the error handling functionality.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF EMBODIMENTS

Figure 1:
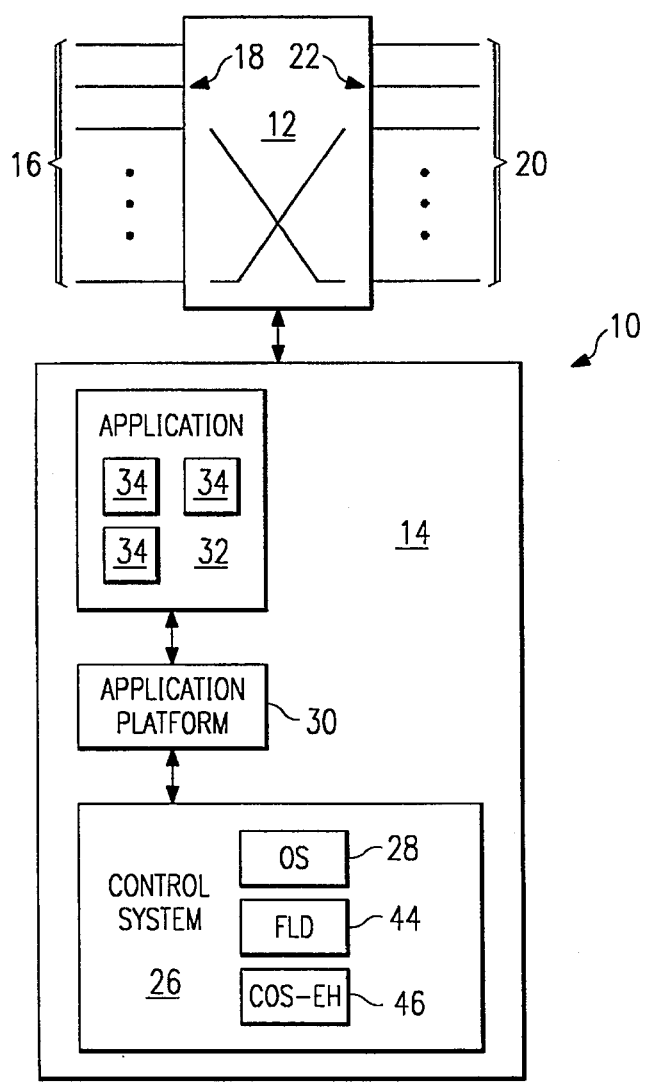
FIG. 1 is a simplified block diagram of a telephone exchange having a process centralized error handling functionality.

Reference is now made to FIG. 1 wherein there is shown a simplified block diagram of a telephone exchange 10 comprising switching equipment 12 connected to a computer 14 operating to provide telecommunications facilities (services and features) to subscribers. The switching equipment 12 operates to physically connect for routing of telephone communications certain ones of the first communications lines 16 provided at a first port 18 of the exchange 10 to certain ones of the second communications lines 20 provided at a second port 22 of the exchange. The first lines 16 comprise communications links connected, for example, to a plurality of telephones. The second lines 20 comprise communications links (for example, trunk lines) connected to other telephone exchanges (not shown). Other configurations, specified functions and attached communications devices for the communications lines 16 and 20 are known to those skilled in the art.

A control system 26 for the computer 14 provides execution and memory resources as well as services such as: a database for persistent data storage; a framework for implementing managed software objects, operating services (clocks, timers, etc.); management of application programs; and, control over start and restart procedures and error recovery. The control system 26, comprising for example of a UNIX®, DICOS® or like operating system, is used to govern platform operation by managing the resources provided on the system. The control system 26 accordingly includes functions that hide the existence of individual processing units from an application platform 30 and a plurality of applications 32 executed by an operating system 28 of the control system 26. This accordingly gives rise to an image of the existence in the computer 14 of just one large processor instead in several individual processing units.

The plurality of applications 32 executed by the operating system 28 control operation of the switching equipment 12 to provide not only POTS functionality, but also other well known subscriber facilities (services and features) including call waiting, three-party calling (conferencing), speed dialing, and call following. The application platform 30 applications 32 are programmed in an object oriented programming language (like C++) compatible with the chosen operating system 28. The applications 32 are executed as cooperating processes 34, interacting with each other, with the control system 26 and with the switching equipment 12. Accordingly, one or more processes 34 exist within each application 32. The processes 34 interact (i.e., send operation requests to another process) by invoking remote operations on each other, or engaging in a dialog of remote operations. Each process 34 comprises an independently executing unit performing a specific task required for implementing its associated application 32. By independently executing unit it is meant that the process 34 executes its code regardless of what other processes are doing at the same time.

Figure 2:
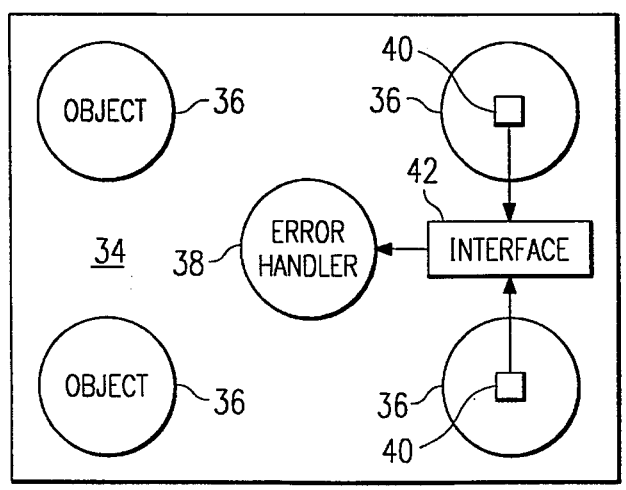
FIG. 2 schematically illustrates the configuration of the process centralized error handler of the present invention.

Referring now to FIG. 2, there is illustrated one particular process 34 in an application 32 executed by the processor 28. It will, of course, be understood that other processes (not shown) exist within the application 32 and interact with the process shown. Each process 34 in an application 32 includes a plurality of objects 36, one of which comprising an object functioning as an error handler 38 for that process. Furthermore, one or more of the remaining objects 36 in each process 34 include defensive programming (checks) 40 for detecting errors in or concerning the objects in the executing process and application. Error detection on the object level concerns at least both the detection of interface violations due to erroneous usage, and the detection of internal errors due to failure of an object to correctly provide a requested service.

Errors detected by defensive programming 40 are reported to the error handler 38 via an error interface 42 and a linked procedure call. The report of the detection of an error by a defensively programmed object 36 will include information about the error including error type, error code, an identification of the object detecting the error, and other data (perhaps comprising application specific data or other user data). The error handler 38 provides all necessary error handling logic to perform three main activities: error reporting; error analysis; and, error recovery. The provision of an error handler 38 in each process 34 centralizes the functions of reporting (isolating), analyzing and recovering from the detected error in the process itself rather than in the object or system level as has historically been implemented. Use of such a process centralized error handler 38 thus assists in coordinating within the process 34 the error handling and recovery operations necessary for returning the application 32 to a well defined state following an error occurrence.

The determination of where and how much defensive programming 40 to insert within a process 34 is an important programming consideration. The main objective of such defensive programming measures is the early detection of errors in order to avoid error propagation. The error detection mechanism further should provide enhanced fault localization capability, facilitate handling of the errors in an application friendly manner, and desensitize the software against technical evolution (especially in connection with the associated hardware and other resources). Accordingly, in order to achieve these goals, it would initially appear that the more defensive programming included, the better. This is not true, however, because too much defensive programming may instill user distrust in the software and adversely affect execution speed of the application 32. In telecommunications exchanges where subscriber and provider trust and speed of connecting communications links between and providing selected features to subscribers are critical concerns, distrust and execution delays caused by excessive defensive programming are particularly unacceptable. Thus, in the present invention, error detection in the form of defensive programming 40 in exchange processes 34 is kept to a minimum and concentrated on error propagation points in the stable, general portions of the programming. Defensive programming 40 is preferably located at error propagation points like communications between processes, interfaces between objects 36 and processes 34 (especially with respect to data bases), and open interfaces. Defensive programming is avoided in programming parts subject to frequent programming changes or modifications.

Referring again to FIG. 1, the operating system 28 further includes a fault locating dump (FLD) 44 and a communications operating system error handler (COS-EH) 46. The fault locating dump 44 provides a storage area for logging information about object detected errors handled by the error handler 38 for each process 34. Storage of this error information is needed to facilitate both reconstruction of the detected error and testing of the application 32 and process 34 after a correction is made or a restart is initiated following a process crash or process abort. The COS-EH 46 functions to isolate, analyze and recover from errors detected in the operating system 28. The COS-EH 46 further specifically handles escalation of recovery from errors, meaning that it operates to detect and respond to instances where errors detected by objects 36 and handled by the error handler 38 occur too frequently. Such recovery escalation is performed in instances where an error occurs more than a specified number of times, and also where an error occurs more than a specified number of times within a certain period of time. A time stamping functionality in the COS-EH 46 identifies the time each reported error occurs in order to facilitate measurement of the error times and the detection of the latter type of recovery escalation. Following an escalation determination, the COS-EH 46 decides when a process 34 should be aborted or a processing unit (or processor), subnetwork or zone of the system restarted.

Figure 3:
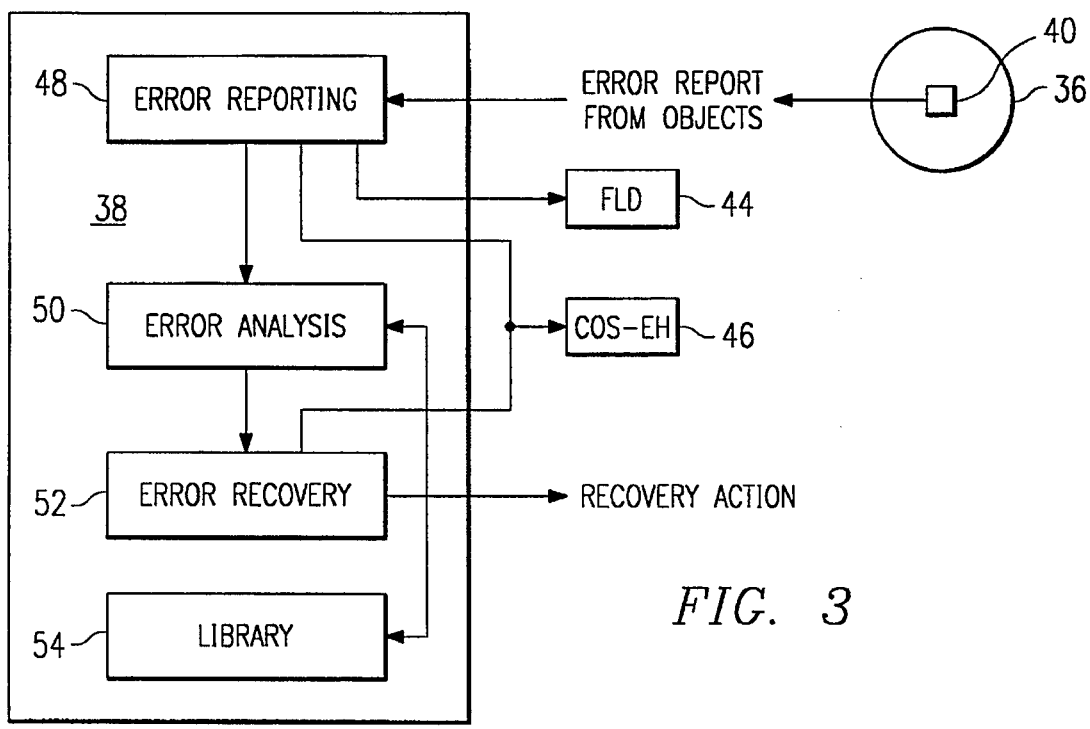
FIG. 3 illustrates the functionality provided by the process centralized error handler of the present invention.

Reference is now made to FIG. 3 wherein there is illustrated in more detail the functionality of the error handler 38. The basic functionality of the error handler 38 includes error reporting 48 (also referred to as isolation), error analysis 50 and error recovery 52. The error reporting 48 functionality receives an error report from an object 36 with defensive programming 40 and reports the detected error to the fault locating dump 44, and to the COS-EH 46, if necessary. The error analysis 50 functionality processes the error report and, with the assistance of a library 54 storing basic error recovery measures supporting different kinds of recovery actions, identifies a recovery action that will effectuate a recovery from the detected error and bring the application 32 back to a well defined state. The error recovery 52 functionality implements the recovery action identified by error analysis 50. The error recovery 52 functionality also informs the COS-EH 46 of the error when necessary.

The recovery action identified by error analysis 50 from the library 56 is structured to include recovery actions on either or both the process and activity levels. By error recovery on the process level, it is meant that the recovery actions are taken only within the process 34 where the error was detected. Error recovery on the activity level, on the other hand, refers to recovery actions taken within the process 34 where the error was detected that will influence other processes in the application 32.

The basic recovery measures implemented in recovery actions by the error recovery 52 functionality comprise: aborting the process in which the error occurred; reporting the error to the COS-EH and aborting the process in which the error occurred; releasing captured resources associated with the process in which the error occurred; increasing a counter; increasing a counter if the same error previously occurred within a specified period of time; delivering a counter value; and, doing nothing except for returning control to the object that reported the error.

The basic functionality of the error handler 38 may be further refined to provide a default functionality implemented to fit, account for and respond (with a default recovery) to the errors anticipated to occur in as many applications 32 as possible. In principle, the actions of the default functionality comprise the handling of controlled error situations with a controlled, application specific process termination, and handling of uncontrolled error situations or unreliable processes with an abortion of the process. The default functionality accordingly associates (using the error analysis 50 functionality) certain error type and code information reported by defensively programmed the object 36 with a certain default recovery action (using the error recovery 52 functionality). The default recovery actions comprise one or more of the basic recovery measures specifically chosen to be implemented in response to a detected error. The default recovery actions include: immediately aborting the process in which the error occurred; reporting the error to the COS-EH and then aborting the process in which the error occurred; releasing captured resources associated with the process in which the error occurred and then aborting the process in which the error occurred; releasing captured resources associated with the process in which the error occurred, then reporting the error to the COS-EH and then aborting the process in which the error occurred; and, determining if then threshold value for a counter has been exceeded, and then implementing escalation by releasing captured resources associated with the process in which the error occurred, then reporting the error to the COS-EH and then aborting the process in which the error occurred.

The default functionality may be further refined to provide an application specific functionality implemented to fit, account for and respond to specific errors for specific applications 32. Both error analysis 50 and error recovery 52 may be so refined and specialized. With respect to specialized error analysis, new errors (i.e., error type and code) and the recovery actions implemented in response to the detection of these new errors are established. Also, certain errors previously defined with a certain recovery action (perhaps a default recovery action) are specified in the specialized error analysis to lead to a different recovery action. A specification concerning whether the error should be reported to the COS-EH 46 is also made. With respect to specialized error recovery, new recovery actions and modifications of old or default recovery actions to address certain errors are specified. The new or modified recovery actions include specialized combinations of the basic recovery measures. In processing object detected errors, the specialized error analyses and error recovery actions are implemented by the error handler 38 before any default error and recovery analysis is made.

Error handling and recovery in the applications executing on the exchange is accordingly advantageously performed in a centralized fashion on the process level in order to return the application 32 to a well defined state. The error handler 38 provides the basic error handling functionality including a default behavior for recovering from errors based on the default error analysis. In situations where the default analysis and recovery action does not adequately address the error, specialized error handling and recovery actions are designed and provided for the error handler 38. It is preferred, however, that the default functionality be capable of handling most errors that occur.

Figure 4:
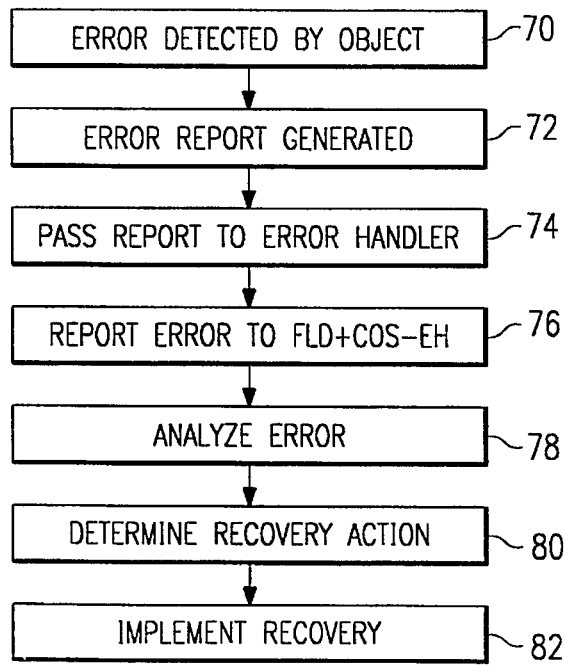
FIG. 4 is a flow diagram illustrating process centralized error handling and recovery in accordance with the present invention.

Reference is now made to FIGS. 1–3 along with the flow diagram of FIG. 4 to illustrate process centralized error handling and recovery in accordance with the present invention. At step 70 an error is detected by a defensively programmed object 36 in a process 34 of an application 32. A report of the error is generated at step 72, and passed on to the error handler 38 at step 74. The error handler comprises a specially programmed object 36 in the process 34 providing a centralized location within the process for the reporting of, analyzing and recovery from software errors. The error is reported (48) by the error handler 38 to the fault locating dump 44 at step 76, and further reported to the COS-EH 46, if necessary. Analysis (50) of the reported error is performed by the error handler 38 at step 78, and a recovery action is determined at step 80. The determined recovery action is then implemented (52) at step 82 to return the application 32 to a well defined state.

Figure 5:
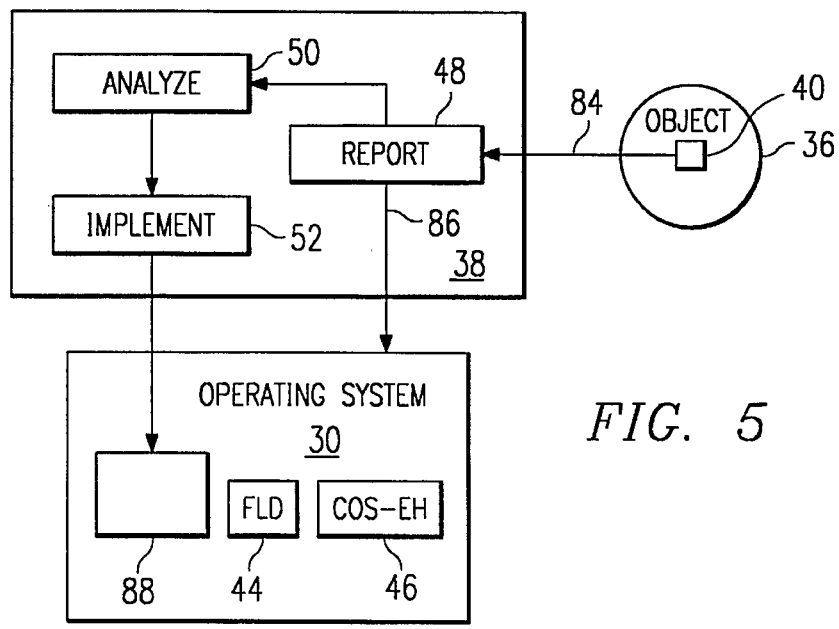
FIG. 5 is a schematic diagram illustrating the response of the process centralized error handler to the detection of an error by an object.

Referring next to FIG. 5, there is shown a schematic diagram illustrating an example of the response of the error handler 38 to the detection of an error by a defensively programmed object 36. The error is detected by the defensive programming 40 in the application object 36. The detected error is then reported to the error handler 38 via logic path 84 utilizing a linked procedure call. For this example, it will be assumed that the error handler 38 includes both default and specialized error handling and recovery. The error is reported (48) by the error handler 38 to the control system 26 (and in particular the fault locating dump 44 and/or the COS-EH 46) via logic path 86. Through the COS-EH 46, recovery escalation and processor restarts may be instigated in response to error detection. The error handler 38 analyzes (50) the reported error to determine an appropriate recovery action. If the analysis is specialized, a specialized recovery action is determined and specified. If, on the other hand, the error does not require specialized handling, a default recovery action is determined and specified. The specified recovery action 88 is then implemented (52) by the error handler 38. In this example, the specified recovery action 88 from the detected and reported error is processed by the operating system 28 as a termination of the process 36 where the error occurred.

Figure 6:
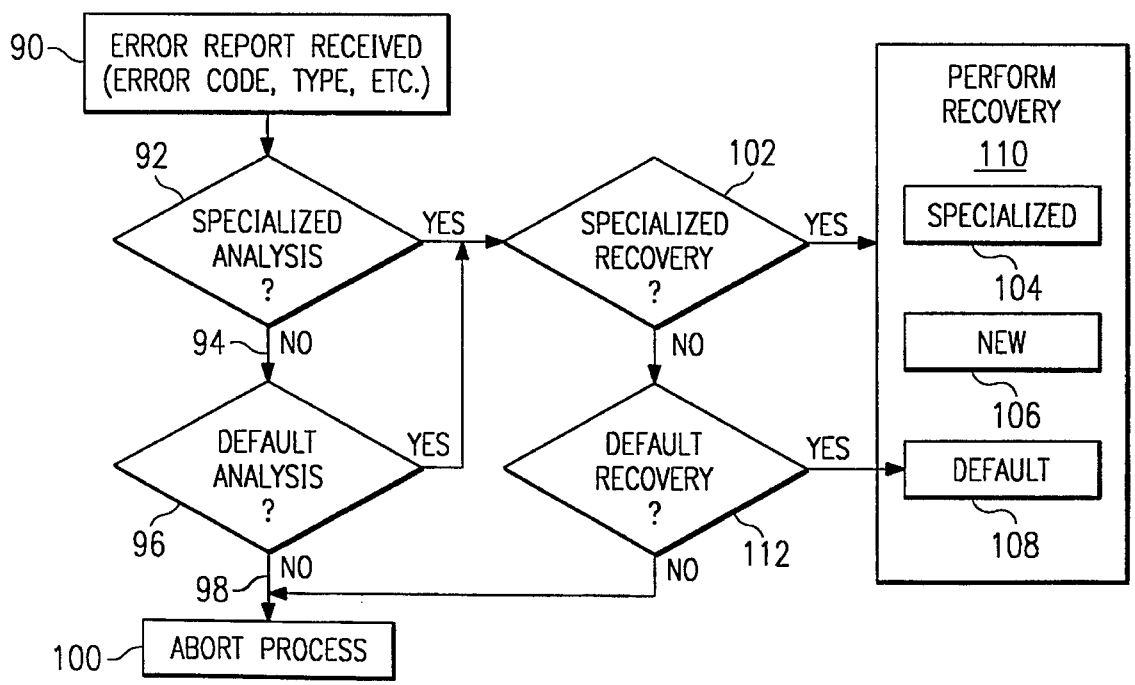
FIG. 6 is a flow diagram illustrating in greater detail the process centralized handling of and recovery from an error in accordance with the present invention.

The flow diagram of FIG. 6 illustrates in more detail the process centralized error handling and recovery operation of the present invention. At step 90, the error handler receives a report of the error, the report including an error code and an error type designation. Thereafter, at step 92 a determination is made on whether the error code and type are defined in the specialized error analysis function. If no (branch 94), the error code and type are checked in step 96 against the default error analysis. If the error code and type are not defined in the default error analysis (branch 98) the process is aborted at step 100. If the error code and type are defined in either the specialized error analysis (step 92), or the default error analysis (step 96), a determination of the specified recovery action in specialized recovery analysis is made at step 102. The determined specified recovery action (step 102) comprises either a specialized recovery 104, a new recovery 106, or a default recovery 108 and is performed in step 110. If no specialized recovery is defined in step 102, a determination of the specified recovery action in default recovery analysis is made at step 112. The determined specified recovery action (step 112) comprises a default recovery 108 and is performed in step 110. If no recovery is specified from default recovery analysis in step 112, the process is aborted in step 100.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a software application owning a plurality of processes, each such process including a plurality of objects, a process centralized method for handling errors, comprising the steps of:

defensively programming certain ones of the plurality of objects in each process to detect and report on the occurrence of errors within that process;

providing an error handler object for each process;

reporting of errors detected by the defensively programmed objects in the process to the error handler object in that same process; and analyzing of the reported errors by the error handler object in that same process; and specifying of a recovery by the error handler object in that same process for returning the application owning the process in which the detected error occurs to a well defined state and thus effectuate a coordinated, process centralized; error handling response.

2. The method of claim 1 further including the step of logging the occurrence of the detected error.

3. The method of claim 1 wherein the step of reporting comprises the step of reporting the detected error to the error handler object using a linked procedure call.

4. The method of claim 1 wherein the step of specifying comprises the step of defining at least one default recovery.

5. The method of claim 1 wherein the step of specifying comprises the step of defining at least one specialized recovery.

6. The method of claim 1 wherein the step of analyzing comprises the step of performing a default error analysis.

7. The method as in claim 1 wherein the step of analyzing comprises the step of performing a specialized error analysis.

8. A telephone exchange having process centralized error handling functionality, comprising:

a switching circuit; and a computer for controlling operation of the switching circuit in accordance with a plurality of telecommunications feature providing applications, each application owning a plurality of processes with each owned process having a plurality of objects including:

first objects defensively programmed to detect and report errors within the process, and a second object programmed to analyze each reported error from the first objects in the same process and specify a coordinated, process centralized, error handling recovery for returning the application owning that same process in which the detected error occurs to a well defined state.

9. The telephone exchange as in claim 8 wherein the recovery measure comprises a default recovery.

10. The telephone exchange as in claim 8 wherein the recovery measure comprises a specialized recovery.

11. The telephone exchange as in claim 8 wherein the programming of the second object implements a default error analysis.

12. The telephone exchange as in claim 8 wherein the programming of the second object implements a default error analysis.

13. A method for handling errors in a software application comprising a plurality of interacting processes, each process including a plurality of objects, the method comprising the steps of:

programming one of the plurality of objects in each process as an error handler for that process, the error handler programmed with specialized and default error analyses and specialized and default error recoveries;

defensively programming certain other ones of the plurality of objects to detect the occurrence of errors in the process and report, with an error code and an error type, the detected error to the error handler object in the same process where the error is detected; and processing by the error handler in that same process of the reported error to effectuate a coordinated, process centralized, error handling response by:

processing the error code and error type using the specialized error analysis in the error handler object to determine a specialized error recovery;

performing the determined specialized error recovery;

in the event a specialized error recovery is not determined from the specialized error analysis, processing the error code and error type using the default error analysis in the error handler object to determine a default error recovery; and performing the determined default error recovery.

14. The method as in claim 13 further including the step of logging the occurrence of the detected error.

15. The method as in claim 14 wherein the step of logging comprises the step of storing the error type and error code for the error along with an identification of the object reporting the error.

\* \* \* \* \*